Dec. 4, 1928.

F. FAUDI 1,693,840

BALL AND SOCKET JOINT

Filed April 14, 1927

Inventor:
Fritz Faudi,
by Paul A. Schilling,
Attorney.

Patented Dec. 4, 1928.

1,693,840

UNITED STATES PATENT OFFICE.

FRITZ FAUDI, OF DUSSELDORF-OBERKASSEL, GERMANY.

BALL AND SOCKET JOINT.

Application filed April 14, 1927, Serial No. 183,676, and in Germany November 15, 1926.

This invention relates to improvements in ball and socket joints, especially designed for use in connection with the steering gear of automobiles and for other similar uses, of that type in which the ball head is journaled in the socket between a lower stationary bearing member and an upper yieldingly mounted bearing member. In this class of ball and socket joints, the stationary bearing member is forced home with a driving fit in its seat, as a result of which it is liable to be distorted by the blows delivered upon it. As both bearing members should be very accurately shaped, any distortion of the stationary bearing member is liable to cause binding of the parts, with undue wear and tear, or other irregularities.

The main object of my invention is to provide a construction whereby this disadvantage is obviated, and accuracy of the lower bearing member secured, without reducing the strength or efficiency of the joint.

A further object of the invention is to provide a construction in which the lower bearing member is secured in position by means of a closure cap applied to the socket member, together with means for securely holding said closure cap in position against accidental displacement, and which closure cap serves additionally as a cage or guide for the movable bearing member.

The invention consists of the features of construction, combination and arrangement of parts, hereinafter fully described and claimed, reference being had to the accompanying drawing, in which:—

Figure 1:
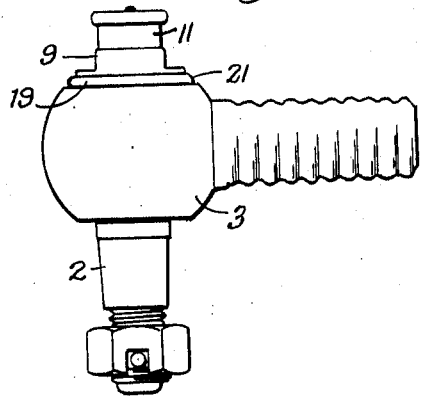
Figure 1 is a side elevation of a ball and socket joint constructed in accordance with my invention.
Figure 2:
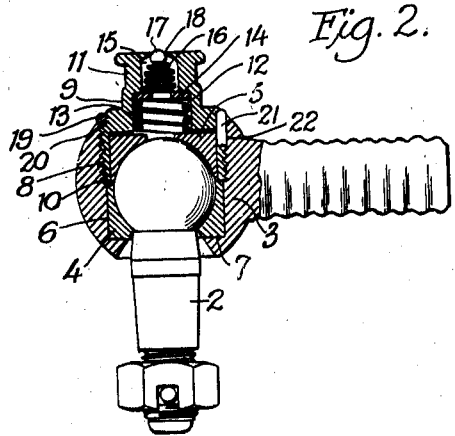
Figure 2 is a vertical section through the ball and socket joint.
Figure 3:
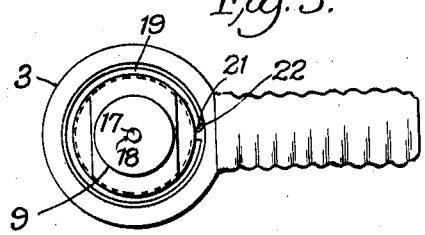
Figure 3 is a top plan view of the same.

Referring to the drawing, 1 designates the ball head upon the bolt or shank 2, which ball head is journaled in the socket 3 between a lower stationary bearing member 4 and an upper movable bearing member 5.

The lower bearing member 4, as shown, is seated within a smooth-walled lower portion 6 of the bore or chamber of the socket member 3, and bears at its base against an annular shoulder 7 whereby it is held from downward displacement. Above this portion 6 the bore or chamber of the socket member 3 is of uniform diameter, and opens through the top of the socket member and is internally threaded, as shown at 8. A cap 9 is provided to close the upper end of this bore or chamber, and this cap is provided with a comparatively deep flange 10 which is externally threaded and engages the internal threads 8 of the bore or chamber of the socket member. When the cap is fully applied in position the lower edge of its flange bears against the upper edge of the bearing member 4 and holds said bearing member firmly in position against any possibility of displacement under movements of the ball head 1. The construction described adapts the bearing member 4 to fit snugly in position with a press-fit sufficient to hold it from dropping out when the movable bearing member, cap and ball member are disconnected from the socket member, thus facilitating assemblage of parts in making up the joint, while in the working action of the joint, in practical use the cap maintains the bearing member 4 firmly and accurately centered with respect to the movable bearing member 5 and the ball head 1.

The movable bearing member 5 is of smaller diameter than the stationary member 4 and of such diameter as to fit within the flange of the cap. Said movable bearing member 5 is of sufficiently less diameter than the internal diameter of the cap flange to adapt it to have free up and down movement, and it is of less depth than the cap flange to have a certain range of vertical movement to allow free play of the ball member 1, and to compensate for wear upon their engaging surfaces. The head of the cap is provided with a bonnet 11, and the head and bonnet are formed with a chamber 12 enclosing a coiled spring 13 which bears at its base against the upper surface of the bearing member 5 and holds it yieldingly pressed in engagement with the ball member, while allowing said bearing member to have the determined range of vertical play above described. The spring bears at its upper end against an annular or perforate washer 14 which seats against a shoulder formed between the top of the chamber 12 and bottom of a chamber 15 formed in the top of the bonnet, in which chamber is disposed a spring 16 seated on said washer and acting to hold a valve member 17 in position to normally close a lubricating opening 18 in the top of the bonnet. The spring 16 is adapted to yield under pressure applied to the valve 17 to permit the valve to open for the introduction of oil or other lubricant, which may flow downward through the annular washer 14 and spring 13 and through an opening in the bearing member 5 to the bearing surfaces of the ball head and bearing members, whereby the same may be kept thoroughly lubricated.

In order to lock the cap in position against any possibility of movement out of its set position a locking device 19 is provided. This device comprises a spring wire ring which lies in clamping engagement with a groove 20 of the cap and has one of its ends angularly bent to provide a locking pin or detent 21, which pin or detent projects downwardly into a locking recess 22 formed by matching grooves in the wall of the socket and opposed surface of the cap, whereby the cap is locked against rotation and displacement.

Having thus fully described my invention, I claim:—

1. A ball and socket joint comprising a ball member, a socket member having an internal flat shoulder at a right angle to the socket wall, relatively stationary and movable bearing members for the ball member in said socket member, and a cap engaging the socket member and enclosing the said movable bearing member and clamping the said stationary member in position against the shoulder in the socket member.

2. A ball and socket joint comprising a ball member, a socket member having an internal flat shoulder at a right angle to the socket wall, relatively stationary and movable bearing members for the ball member in said socket member, a cap engaging the socket member and enclosing the said movable bearing member and clamping said stationary bearing member in position against the shoulder in the socket member, and a spring in the cap yieldingly backing the movable bearing member.

3. A ball and socket joint comprising a ball member, a socket member, relatively stationary and movable round bearing members for the ball member in said socket member, said movable bearing member being of less diameter than the stationary bearing member, and a cap provided with a flange having a threaded engagement with the socket member and enclosing the movable bearing member and engaging and clamping said stationary bearing member in position in the socket.

4. A ball and socket joint comprising a ball member, a socket member, relatively stationary and movable bearing members for the ball member in said socket member, the movable bearing member being of less diameter than the stationary bearing member, a cap having a threaded flange engaging the socket member and enclosing the movable bearing member and bearing against the stationary bearing member to hold the latter from displacement, and a spring in the cap yieldingly backing the movable bearing member.

5. A ball and socket joint comprising a ball member, a socket member, relatively stationary and movable bearing members for the ball member in said socket member, a cap engaging the socket member and enclosing the said movable bearing member and clamping said stationary bearing member in position in the socket member, and a locking element embracing the cap and having an angularly bent locking portion engaging the socket and cap to hold the latter from retrograde rotation.

In testimony whereof I affix my signature.

FRITZ FAUDI.